US007089237B2

(12) United States Patent
Turnbull et al.

(10) Patent No.: US 7,089,237 B2
(45) Date of Patent: Aug. 8, 2006

(54) INTERFACE AND SYSTEM FOR PROVIDING PERSISTENT CONTEXTUAL RELEVANCE FOR COMMERCE ACTIVITIES IN A NETWORKED ENVIRONMENT

(75) Inventors: Donald R. Turnbull, San Carlos, CA (US); Hinrich Schuetze, San Francisco, CA (US)

(73) Assignee: Google, Inc., Mountain View, CA (US)

( * ) Notice: Subject to any disclaimer, the term of this patent is extended or adjusted under 35 U.S.C. 154(b) by 906 days.

(21) Appl. No.: 09/770,702

(22) Filed: Jan. 26, 2001

(65) Prior Publication Data

US 2002/0103789 A1    Aug. 1, 2002

(51) Int. Cl.
*G06F 17/30* (2006.01)
(52) U.S. Cl. ............................................ 707/5; 707/10
(58) Field of Classification Search .................... 707/1, 707/3, 4, 5, 6, 10
See application file for complete search history.

(56) References Cited

U.S. PATENT DOCUMENTS

| | | | | | |
|---|---|---|---|---|---|
| 5,855,015 | A | * | 12/1998 | Shoham | 707/4 |
| 6,067,552 | A | * | 5/2000 | Yu | 715/501.1 |
| 6,256,633 | B1 | * | 7/2001 | Dharap | 707/4 |
| 6,810,395 | B1 | * | 10/2004 | Bharat | 707/4 |
| 6,963,867 | B1 | * | 11/2005 | Ford et al. | 707/3 |

FOREIGN PATENT DOCUMENTS

EP            1120719 A2  *  8/2001

* cited by examiner

*Primary Examiner*—Jack M. Choules
(74) *Attorney, Agent, or Firm*—Fenwick & West, LLP

(57) ABSTRACT

A search and recommendation system employs the preferences and profiles of individual users and groups within a community of users, as well as information derived from categorically organized content pointers, to augment electronic commerce related searches, re-rank search results, and provide recommendations for commerce related objects based on an initial subject-matter query and an interaction history of a user. The search and recommendation system operates in the context of a content pointer manager, which stores individual users' content pointers (some of which may be published or shared for group use) on a centralized content pointer database connected to a network. The shared content pointer manager is implemented as a distributed program, portions of which operate on users' terminals and other portions of which operate on the centralized content pointer database. A user's content pointers are organized in accordance with a local topical categorical hierarchy. The hierarchical organization is used to define a relevance context within which returned objects are evaluated and ordered.

27 Claims, 5 Drawing Sheets

INTERFACE AND SYSTEM FOR PROVIDING PERSISTENT CONTEXTUAL RELEVANCE FOR COMMERCE ACTIVITIES IN A NETWORKED ENVIRONMENT

CROSS-REFERENCE TO RELATED APPLICATIONS

This application is related to co-pending U.S. patent application Ser. No. 09/305,844, filed May 5, 1999, entitled SYSTEM AND METHOD FOR SEARCH AND RECOMMENDING DOCUMENTS IN A COLLECTION USING SHARED BOOKMARKS, and is further related to copending U.S. patent applications entitled HIERARCHICAL MODEL FOR DYNAMIC PERSONALIZATION OF OBJECT SPACES AND PRIVACY PROTECTION, application Ser. No. 09/730,112, and SYSTEM AND METHOD FOR SEARCHING AND RECOMMENDING OBJECTS FROM A CATEGORICALLY ORGANIZED INFORMATION REPOSITORY, application Ser. No. 09/730,501, both filed on Dec. 4, 2000, all of which are commonly owned by the assignee of the present invention and the entire disclosures of which are expressly incorporated herein by reference.

FIELD OF THE INVENTION

The invention relates to the field of information searching and browsing, and more particularly to a system and method for enhancing electronic commerce activities through interaction with a personalized relevance interface.

BACKGROUND OF THE INVENTION

The explosion in information search, retrieval and management that has been fueled by ever-increasing advances in computerized data storage and retrieval systems, attendant with the now pervasive World Wide Web, has made a universe of information available to anyone who is able to afford the price of a simple personal computer and has the infrastructure necessary to connect that computer to the global Internet. Anyone, anywhere, may now have access, at anytime, to such vast stores of information as to dwarf the largest historical library system heretofore known.

Information search and retrieval systems enable the ordinary user to acquire any information or knowledge that they deem necessary to carry out any one of a number of daily tasks, from the mundane such as searching out a recipe, to the more prosaic, such as performing research on a Ph.D. thesis in advanced telecommunication theory. Although the World Wide Web has been termed an information superhighway, it is more appropriately characterized as an "information furball", in that there are no clear routes, on-ramps or off-ramps, or more particularly entrance and exit signs, that can point a user to the specific "parking lot" or "garage" that contains the information most relevant to their search. In formation is generally presented in web pages which are posted and accessible through an IP address which has no intuitive relationship to the information it contains. It would be as though a library shelves its volumes in the order in which the volumes were received from a publisher, as opposed to being shelved in accordance with any rational structure.

This particular aspect of "information disorganization" is highly relevant in the area of electronic commerce, once it is understood that a vast body of product is being offered by a large number of vendors over an information medium that is not particularly inductive to rational organization and structure. A user must have some knowledge of certain product offerings, or at least some knowledge of the vendors which offer those products in order for that user to access the particular electronic commerce domain or web page where those products are featured. A user who is performing a generalized search for a particular product is often at a loss to know how to begin, much less how to proceed. Accordingly, if a user were interested in obtaining information relating to wood working tools, for example, the user would either have to have a priori knowledge of the relevant tools, the manufacturer or vendor of the tools, or have access to a large body of relevant keywords along with knowledge of a tool manufacturer or vendor's classification system, in order to develop even a starting point for a relevant search.

Pertinent to the difficulties in rational information retrieval discussed above, are the operational characteristics of commonly known and used search engines which have been developed in an effort to make some sense out of the "information furball". Conventional search engines try to extract particular relevant documents or objects from the plethora of offerings available over the World Wide Web. However, the form and scope of information that is extracted from the net and presented to a user is often as disorganized and unprioritized as the Web itself.

In the context of electronic commerce, a user might be interested in only certain of the offerings made available by a particular commerce domain, while preferring certain other offerings presented on a different domain. Conventional search engines are not able to differentiate between products offered by a multiplicity of commerce domains, particularly when a number of users would assign a different relevance characteristic to the different offerings of the different domains.

Further, anyone ever having performed a search of the Web will recall the frustration at receiving "131,256 hits" in response to a simple query for "java". This is not as fanciful as it appears, since "java" might refer to a programming language, coffee, or one of the larger islands in the southwest Pacific. The particular "java" being referred to in the search is known only to the user. The vast majority of "java" hits are irrelevant and serve only to confuse, frustrate and misdirect.

Recommendation systems are capable of organizing retrieved search results based on criteria provided by a user or by comparing each of the search results to a single specific referred document (i.e., the "more like this" feature offered by EXCITE™ and FIREFLY™, for example). Google™ is an example of a search engine that incorporates several recommendation system-like features and operates in a manner similar to traditional key-word search engines. A search begins by the user's entry of one or more search terms which are used in a pattern matching analysis of documents available on the World Wide Web. It differs from traditional keyword search-based engines in that search results are retrieved and ranked on the basis of a page importance metric, which differs from a mere number of occurrences of a desired search term.

Notwithstanding the attempt to put a page importance metric on particular pages of particular web domains, a user is still confronted with the inability of traditional search and/or recommendation engines to determine the degree of relevance that any one user places on a particular page or commerce domain. For example, one user might prefer products obtained from the SEARS domain, while other users might prefer products offered by WALMART. Search and recommendation engines are unable to make a relevance connection with the user, if a user were to search for shirts. Conventionally, the same list of site hits would be presented to all users, regardless of their domain preferences.

Certain network browsers allow a user to construct a categorical listing of certain of their favorite web pages or domains, i.e., the "favorites" feature offered by Microsoft's Internet Explorer. When visiting a particular page, a user may add that page to their "favorites" as a bookmark and might further organize their bookmark collection according to category. A user must manually select and add a number of sites to their collection which, once added, maintain their importance within the structure without regard to any further access of that bookmark by the user.

A user might construct a set of electronic commerce bookmarks, but these bookmarks might only be pertinent for a particular period of time or in response to a particular interest frame. As a user's interest changes, a conventional bookmark collection will not, unless manually reconfigured from time to time.

Accordingly, what is needed is an intelligent agent or system which is able to understand user imperatives, and track user behavior, so as to adaptively and dynamically construct a personalized, relevance driven domain and/or page map that can assist a user during electronic commerce activities. As a user searches the Web for a particular product offering, the relevance agent or system is able to adaptively inform both searching and result recommendations so as to present only relevant content loaded sites to the user. Further, the relevance agent or system is able to prioritize results in accordance with previously established user preferences for particular commerce domains or specific product manufacturers or vendors.

Having recourse to a user's preferences, the relevance agent or system should be able to automatically generate relevant search parameters, such that if a user is located within a particular commerce domain and wishes to search for particular or alternative product offerings, the system understands the user's desires and automatically generates a directed query for the specific desired goods and/or services.

Such a system should be accessible to a user as an adjunct to a conventional network browser application program and be able to automatically organize and construct an electronic commerce metacatalog, containing only product information which is relevant and timely to a particular user. The system should be accessible at will and not interfere with the ordinary functionality of a browser and, when invoked, not occupy a considerable amount of valuable screen real estate.

SUMMARY OF THE INVENTION

The invention relates to a method for enhancing an electronic commerce experience by promoting user interaction with an information repository, where the repository is characterized as an object space, the user accessing the object space through a network interface. The method establishes a relevance interface, which adaptively defines a collection of content pointers, each content pointer corresponding to an object within the space. The collection is organized as a grouping of sets of indicia, the relevance interface overlaying and cooperating with said network interface.

At least one subject keyword is generated and the object space is searched in accordance with the keyword query. Objects are retrieved from the object space, with each retrieved object associated with the query keyword. Retrieved objects are organized in accordance with a context derived from the relevance interface, retrieved objects being displayed to a user over the network interface in a ranking order corresponding to the context derived organization.

In a particular aspect of the invention, retrieved objects are interacted with and a historical record of object interaction by a user is maintained. A user is enabled to store or select preferred objects and the retrieved objects are organized in accordance with a context derived from the historical record. Specifically, the network interface includes a network browser application configured to display content defining an information object with the relevance interface automatically generating at least one subject keyword from a context derived from content of a displayed information object.

In a further aspect, maintaining a historical record of object interaction includes analyzing user behavior with respect to displayed information objects, and where the organizational context is derived from the analyzed user behavior. User behavior might be selected from the group consisting of a user dwell time at a particular information object, a number of repeat visits to a particular information object, and a number of purchases made from a particular Web site.

In an additional aspect of the invention, a catalog of relevant information object collections is established with the relevance interface automatically populating the catalog with relevant information object collections in accordance with analyzed user behavior.

In yet a further aspect of the invention, a relevance interface is established which adaptively defines a collection of content pointers, each content pointer corresponding to an object within an information repository characterized as an object space. The collection of content pointers is organized as a context relevant hierarchy, the relevance interface overlays and cooperates with a network interface such as a network browser. A user browses through a plurality of objects within the object space using the relevance interface and accesses particular ones of the objects. Each such accessed object is assigned to a position within the context relevant hierarchy. A context indicia of each accessed object is evaluated and the relevance interface displays the context relevant hierarchy to a user in accordance with a ranking order determined by a user profile. The user profile is defined by a relevance model, with the relevance model adaptively redefining the context relevant hierarchy in accordance with objects accessed by the user.

In a further aspect of the invention, an information repository comprises a plurality of network domains, with each including a plurality of content pages organized in accordance with a product hierarchy. The collection of content pointers comprises a hierarchical organization of user defined recommended content sites, with the relevance interface assigning particular ones of content pages from an access domain to the collection of content pointers in accordance with a user's hierarchical organization of recommended content sites. The relevance model adaptively redefines the context relevant hierarchy in accordance with a user's browsing interaction metric, where the interaction metric might be selected from the group consisting of a user dwell time at a particular page, a number of repeat visits to a particular page, a time of day, a time of year, a system-type used to access a page and a number of purchases made from a particular domain.

In yet a further aspect, a user searches at least a portion of the collection of shared content pointers in accordance with the keyword query. The query is augmented with at least one vectorized token derived from the collection. The information repository is searched in accordance with the augmented query keyword and the augmented query keyword is matched to a content indicia associated with at least one of a group of objects. The objects, having a match between their content indicia and the augmented query keyword are retrieved and organized in accordance with a context derived from a topical categorical hierarchy defining the content pointer collection. Retrieved and organized objects are displayed to a user.

BRIEF DESCRIPTION OF THE DRAWINGS

These and other features, aspects and advantages of the present invention will be more fully understood when considered in connection with the following specification, appended claims, and accompanying drawings, wherein:

DETAILED DESCRIPTION OF THE INVENTION

Figure 1:
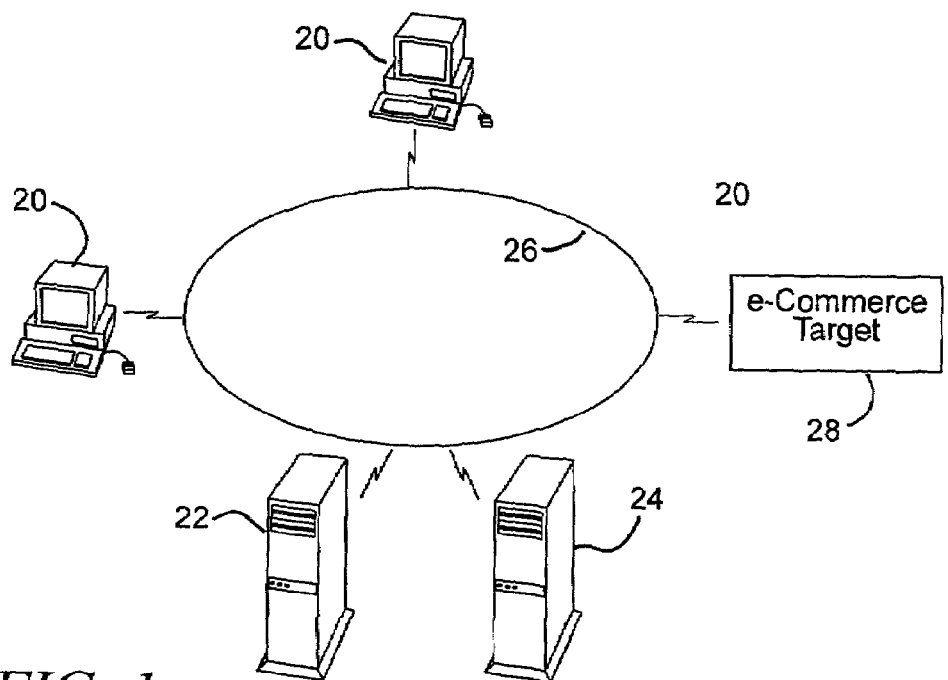
FIG. 1 is a simplified, semi-schematic, block diagram illustrating the physical aspects of the invention, as it would be implemented in the context of a wide area network.

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Briefly, the systems and methods of the present invention pertain to establishing a personalized relevance context within which e-commerce activities can be undertaken with a greater degree of efficiency and utility. In this regard, a personally relevant commerce experience is given effect by enabling the novel system to acquire and adaptively develop a deep understanding of each individual user's preferences and behaviors which are consequently used, by the system, to modify and structure a user's browsing and searching activities so as to define relevant results. The novel system supports these activities by providing a relevance interface, which supports these tasks, i.e., searching and browsing, in tandem coupled to a relevance engine, operating in background, which supports relevance and contextual activities at times deemed appropriate by the user.

In particular, the system's interface element, to be described in greater detail below, is provided as a ubiquitous sidebar application (similar to those implemented in Microsoft Internet Explorer in connection with its "search," "favorites" and "history" functionality), a window instance, or a frame, as a collateral implementation of a conventional browser interface. Sidebars, implemented in a conventional browser environment, are well understood by those having skill in the art and need not be discussed with any greater detail herein. It is sufficient to note that the interface, according to the invention, is so implemented and is intended to function as a collateral applet in connection with a browser such as the aforementioned Microsoft Internet Explorer, or Netscape Navigator. Further, this browser application instance is able to be realized in any form of networked environment, most notably implemented via the Worldwide Web or Internet, using HTTP Protocols, but may also be implemented for intranets of information, such as controlled access catalog systems, or for handheld or wireless devices using non-Web standard protocols.

In accordance with the invention, a sidebar interface (also termed a SideCart) is implemented as part of a browsing/searching application and is functionally coupled to a background system in order to collect behavioral activity from a user and to define a persistent, dynamic interface which implements augmented relevance assistance, defined by the background system, in order to deliver value to system users. As a whole, the system is characterized operationally as a relevance engine for collecting, processing and augmenting a particular user's electronic commerce activities and manages such activities by providing contextual information based on the user's characteristics and environment.

At the system level, there are two primary ways in which a system, in accordance with the invention, might be implemented. The system might be used in a relatively passive fashion, in order to filter and inform objects which have been retrieved from a conventional query search in a manner that presents or recommends the search results in a ranking order having relevance to the user. Alternatively, the system can be implemented such that it functions in a more active manner, in that acquired relevance information is provided to a search engine, along with query data, such that a search engine is tasked with establishing which results are relevant and proffering relevant results to the user in a categorically organized manner.

In the exemplary embodiment of FIG. 1, the hardware that is needed to implement such a system can be seen as comprising a user workstation 20, a system implementation server 22, and a generalized third-party application server 24, which may provide the host functionality for a search engine or might alternatively represent the host functionality of perhaps a nominated commercial partner. The user workstation 20 might be configured as any form of electronic data processing device, such as a personal computer (PC), a palm-type computer, a full-function workstation, or a WAP enabled communication device. All that is required is that the user workstation 20 be able to access a communication network, such as the Internet, in order to communicate with either the system server 22, the third-party server 24, or both. Such a communication network indicated in the exemplary embodiment of FIG. 1 at 26, establishes the communication path between and among the user and the various other components of the system.

The system server 22 is illustrated as an independent device, and is anticipated to function as a server as that term is commonly understood in the art, due to the large amount of data and the large amount of users anticipated to be accommodated by the system. However, it is not necessary that the system reside on a specifically server-type architecture. Portions of the system, as will be described in greater detail below, may be resident on each individual user's workstation device 20 and the system, as a whole, might be hosted on a distributor architecture comprising the multiplicity of users wishing to access the system. In its most simplistic form, a user subscribes to the inventive system and interacts with the system as an overlay shell, as the user searches an information repository, such as the Internet, for products and services that are hosted by various electronic commercial marketplaces, indicated generally as e-commerce targets 28, in the exemplary embodiment of FIG. 1. An e-commerce target 28 might be accessed either directly through the system server 22 or might be accessed by the system server 22 functioning in conjunction with a third-party search engine, hosted on third-party server 24.

Given the networked structure of the system in accordance with the invention, it will be appreciated by those having skill in the art, that the user portion of the system might be implemented either in a thin client configuration or a thick client. The interface application which allows the user to access the system may reside on the system server 22 and be accessible through the communication network 26 or, system access functionality might be provided as an application overlay program that the user might download from the system server 22 and execute as a "plug-in" routine or separate client application coupled to the user's browser program. It will be further appreciated that both of these methodologies might be employed by the system, with some users interacting with the system through a thin client interface, other users interacting with the system through a thick client.

Figure 2:
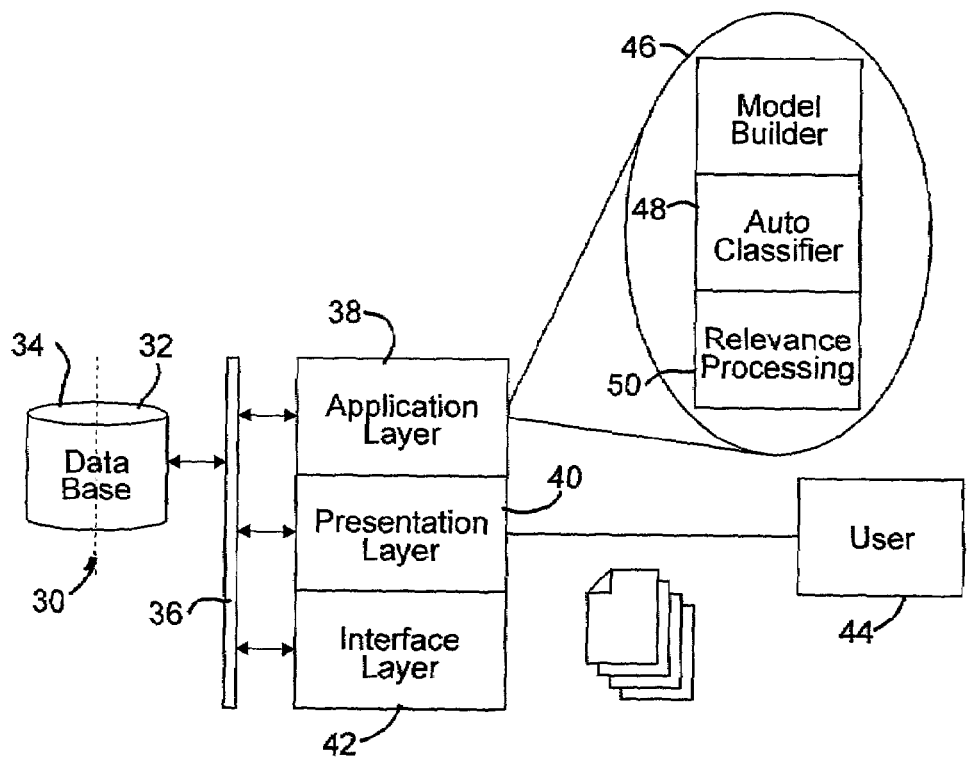
FIG. 2 is a simplified, semi-schematic block diagram illustrating partitioning of functionality in a server system according to the invention.

On a structural level, the exemplary embodiment of FIG. 2 depicts how such a system might be implemented on a system server, such as server 22 of FIG. 1. In the embodiment of FIG. 2, the system suitably comprises a database, indicated generally at 30, which might be viewed as further comprising a relevance model database portion 32 and a categorization database portion 34. The relevance model database portion 32 would necessarily contain individualized relevance models, developed for each of a set of subscribing users, a set of organized user groups, or a community of users. The categorization database portion 34 would further necessarily include an information repository structure map, individualized category database items, and the like, for efficient operation of user behavior characterization and personalized relevance model development. The various functional layers of the system are coupled to the database 30 through a conceptual bust 36, by means of which the component layers of the system communicate with each other and with the database 30.

The system itself is a software application routine and might be viewed as comprising three separate functional layers, a model application layer 38, a presentation layer 40 and a communication interface layer 42. The communication interface layer 42 functions to couple the system to a communication network such as network 26 of FIG. 1, and further allows the system to input and output relevant information in a form which is recognizable and receivable by other nodes existing on the communication network. The communication interface layer 42 might receive a data stream from a search engine presenting the results of a particular query search and direct that data stream to other appropriate functional components of the system for processing, storage and presentation.

In this regard, the presentation layer 40 defines the interface between the system and a user 44. If all of the functionality of the system resides on a particular server (or a server farm, for example) the presentation layer 40 is responsible for presenting the information to the user 44 in a manner that is displayable by the user's browser, for example, and in the form of the SideCart interface, in accordance with the invention. The presentation layer also receives information from the user, such as profiles, script information, search query key words, and the like, and is also responsible for monitoring user activity, such as mouse clicks, bookmark saves, products purchased, page access, timing, and the like. Thus, the presentation layer 40 plays a major part in obtaining information of a type suitable for use by the model application layer in constructing a personalized commerce relevance model for that user.

A model application layer 38 contains the functional blocks necessary to build the personal relevance model for an individual user (or community of users) from data received through other components of the system. The model application layer might be more particularly viewed as comprising a model builder object 46 which functions to define the various relevance parameters that will be used to adaptively inform any browsing or searching activities, undertaken by the user, in the context of an electronic commercial transaction. An auto classify object 48 functions to classify unclassified content objects in accordance with categorization information developed by the system and further in accordance with a repository structure map defined in the categorization database portion 34 of the system's database 30. A relevance processing object 50 functions to apply the relevance model developed by the model builder 46 to content recovered from the information repository and to filter that content so as to provide only timely and relevant results to a user, when the user is engaged in electronic commercial activities.

Viewed in this fashion, it is easy to understand how the various components of the system might be distributed across other hardware elements, such as those depicted in the exemplary embodiment of FIG. 1. Large portions of the presentation layer might be able to be hosted on a capable user workstation 20 while the relevance processor object 50 of the model application layer 38 could be incorporated into a central server system 22. Further, a query search engine could be easily incorporated into the system server 22, thereby eliminating the need for the system server 22 to communicate with a third-party server 24 in order to obtain and utilize a search engine. Alternatively, the relevance processor object 50 of the model application layer 38 could be incorporated into a third-party server system 24 as part of a query search engine's functionality. In this particular case, where the third-party server 24 would be viewed as a "partner" of the novel system, the system need only pass a particular user's relevance model to the third-party server 24 over the communication interface layer 42 in order for the third-party search engine to perform relevance processing on any of that user's search requests.

It will be appreciated that, in the context of the invention, the novel interface is both structural and functional in nature. In one aspect, the interface is contemplated as a ubiquitous sidebar graphical user interface, similar to existing sidebar instances in popular Web browser applications or to similar ToolBar implementation as seen in many software applications. The fundamental difference between sidebar-type interfaces from ToolBar-type interfaces is primarily one of context, where the ToolBar is primarily implemented to function as a swift, iconic access to frequently used commands in an application interface. Sidebars are primarily implemented to enable a set of functionally important tasks to be made available to a user on a persistent basis, but also permit the full breadth of task-oriented functionality via sidebar supports, as opposed to a subset or frequently-used set, as in a ToolBar implementation.

Further, the interface, in accordance with the invention, is an improvement on a sidebar-type implementation as it provides additional context to a task or series of tasks based on a relevance context as determined by the system, to provide a persistent, natural, ubiquitous interface for accessing the system's functionality, as will be described in greater detail below. In this instance, system functionality is focused on commercial activities in a networked environment, and more particularly to providing access to a particular set of functional activities which have been configured, dynamically, by the underlying contextual relevance system. Accordingly, the sidebar interface is not only an improvement in providing an interface for interaction with a full set of system functionality, but also an improvement in providing a set of interface controls which support specifically contextually relevant activities, and defined dynamically by the system.

The particular implementation of the sidebar (the Side-Cart) interface is able to interact with a broad range of devices, network environments and electronic commerce domains. The underlying system is able to determine the context of the particular device upon which the interface is displayed, the networked environment which is being accessed, the commerce domain with which interaction is desired, in combination with a relevance profile established for each individual user. The SideCart interface is adaptively modifiable by the system as well as by the interacting individual user. Adaptive reconfiguration of the interface can be controlled directly by any individual user or can be controlled by the supporting system, by the system's monitoring and evaluating the operational parameters of the user device which displays the SideCart interface, the context of the displaying device (such as device location or time-of-day), the type of networked environment (and the subsequent protocols for data exchange) as well as the particular parameters of any accessed commerce domain.

As will be described in greater detail below, the SideCart interface, in accordance with the invention, provides support for a range of user tasks, including searching over a preferred information repository, searching over information contained within the networked environment, searching across a set of established commerce domains in conjunction with more public networked information (such as the World Wide Web), or a framework, catalog index or any other established hierarchy of information. The SideCart interface also affords support for "browsing" through the same sets of information, as well as supports transition between both searching and browsing modes. Given its substantial range of functional activity support, the graphical portion of the interface is implemented as supporting a number of customizable "skins" (specific display areas) within the graphical interface area, with the skins being configured for specific content domains. Within these interface elements, the supporting system is able to use contextual information derived from an individual user's profile, an aggregate profile or a combination of profiles, in order to categorize and organize the content displayed within each element. Further, the supporting system is able to process information derived from particular domains with which the interface has interacted, in order to further organize and classify the content contained within each of the graphical interface elements.

Advantageously, the SideCart interface includes functionality which allows a user to save references to information (content pointers, bookmarks, preferred links, and the like) in an organized structure that might be implemented in the form of folders, a hierarchical categorical structure, or a list. Such links to information can further be automatically and dynamically established by the system and presented in the interface, as textual or graphical content, representing individual commerce items, advertisements, incentives or navigation aide interface controls. Such automatically and dynamically created links are determined by the system based upon an established user profile, user activity and behavioral characteristics, as well as a contextual relevance model established by a user's profile, activities and the collection of objects, content pointers, bookmarks, or the like, defined within the interface.

The particular form of content display and interface controls implemented within the interface are necessarily dependent upon the content of the main viewing area (main browser window) of the user device's information presentation interface (the browser program, for example). As is well understood by those having skill in the art, a network server system has the ability to determine the operational characteristics of a device with which it is in communication, particularly that device's characteristic viewing parameters, by handshake protocols which are well established and well understood in the art. Thus, the system is able to modify the interface such that it is compatible with a user's viewing device and is able to provide for further customization of the interface by each individual user, in accordance with a range of interface configurations supported by the user's device display characteristics. The content of the main viewing area (the main browser content window in a Web browser, for example) can also be modified by the system so as to display certain domain-specific interface controls, such as hierarchical navigation aids for a commerce domain organized in accordance with a categorical hierarchical structure. The system can also provide content-related characteristics such as preferred link container (folder) names and preferred link content (pre-selected items) as well as task-specific interface controls related to any possible domains with which the interface provides interaction. Such task-specific interface controls could be implemented in the form of tabs, alternate views or sorting mechanisms for searching, browsing and selecting content from the main viewing area. The interface controls in the SideCart interface are able, additionally, to have their interface and attribute information characteristics modified by the system, based on a user provided or system derived set of commerce guidelines, such as sales tax, billing options, shipping options, laws related to distribution, regulation and inclusion of merchandise for pricing, shipping and billing.

Figure 3:
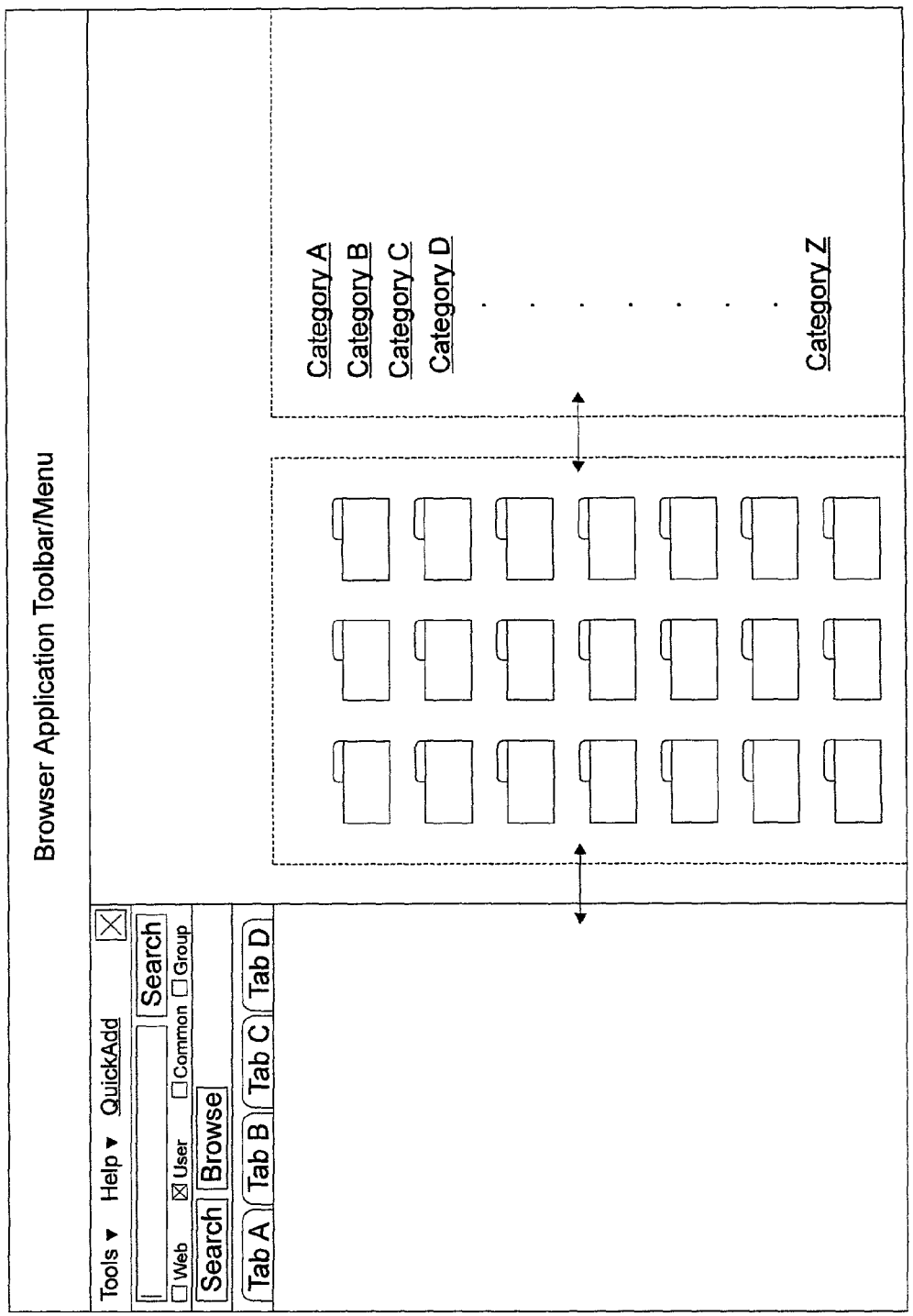
FIG. 3 is a simplified, semi schematic representational screen shot, depicting the co-location of the SideCart interface in the context of a Web browser application.

A user's primary interaction with the system according to the invention takes place through a graphical user interface, implemented as a sidebar-type interface, associated with a user's browser program, as illustrated in the exemplary embodiment of FIG. 3. Characteristically, the SideCart interface 60 is provided to one side of the browser's main viewing window 62 and is invoked by selecting the SideCart interface from among a set of browser function buttons, provided for such purpose. Interface functionality can be captured or adapted by having a user access a particular web site, for example, from which the inventive system is launched, and capturing the functional menu button from the system site. For example, the system site might have an HTML script labeled "add item" or "subscribe," which if accessed, will add the requisite functional implementation controls to the user's browser ToolBar. "Clicking" on the "SideCart" functional implementation button launches the interface 60 in a portion of the browser window, such that it is persistently available to a user during a session. The interface window or frame 60 is organized in a generally conventional fashion, with a set of functional control buttons 64 disposed across the top of the interface screen 60. The functional control buttons 64 might be implemented as drop-down concatenated menus, or might invoke a pop-up window within which the various choices for that function are displayed. In the context of the exemplary embodiment of FIG. 3, the functions invoked by the functional buttons 64 include a "tools" choice, "help" functionality and "quick add" which serves to capture certain content being displayed in the main browser window for inclusion into the content collection of the interface. The "quick add" option, when selected, allows any URL, document location, or item, dragged into the SideCart interface's main viewing window to be immediately added to the content of the window without any intermediate confirmation steps being performed. Customarily, an "add" function will cause a confirmation window to appear whenever a content pointer is added to a sidebar via a drag-and-drop operation.

A search text-entry section 66 is also provided in the interface 60 and allows for key word query searching across a range of information repository options, depending upon the particular mode within which the interface 60 is requested to operate, and/or depending upon the user's choice between and among various search options, as expressed by a set of option selections 68 provided for such purpose. Specifically, the various option selections 68 allow a user to designate whether key word query searching will be performed over content defined by the individual user's interface definition, an aggregate interface definition containing content defined by a particular user community, an aggregate interface definition containing content defined by the universe of system descriptors, or the Internet as a whole. Options represented by the foregoing discussion are not necessarily mutually exclusive. Users have the ability to select a combination of search target options, such as searching the individual user's interface definition along with the content defined by the entire network.

Interface mode switching is performed by selecting one of the interface's operational modes expressed in the mode's button bar 70. In accordance with the invention, the interface supports two primary operational modes, i.e., a search mode 72 and a browse mode 74. Search mode and browse mode are self-explanatory in terms of functionality, but it should be recognized that the underlying functionality of the background system will be adaptively configured for information presentation, depending upon the particular operational mode selected by the user. The modes can also be activated automatically as determined by the relevance model. Preferably, there will be only subtle differences in modality presentation. As interface design matures, all the interactions in the sidebar/SideCart will become more integrated and visually fungible.

For example, and in accordance with the present invention, putting the system into search mode by selecting the search mode option on the interface, allows the system to augment queries, filter search results as well as re-rank search results in accordance with a set of augmentation and priority ranking algorithms, including a personalized hierarchical relevance model, such as the algorithms and models described in connection with co-pending patent application entitled HIERARCHICAL MODEL FOR DYNAMIC PERSONALIZATION OF OBJECT SPACES AND PRIVACY PROTECTION, filed Dec. 4, 2000, commonly owned by the assignee of the present invention, the entire disclosure of which is expressly incorporated herein by reference. The searching function covers the specific tasks of entering a query term, activating the query and processing the query results, which might include not only the previously-mentioned query augmentation, but also might include re-ranking and filtering of query results by the system.

When the interface is configured to operate in browse mode, the interface supports augmented browsing activities, such as evaluation and viewing of search results, organization of search results, the particular form and appearance of search results and any adjunct controls with which to manipulate search results. Browsing, as implemented by the interface of the invention, also includes the ability to access previously visited links to specific commercial content or merchandise, as well the ability to access saved or preferred links to such commercial content or merchandise. Browsing over the information contained within the SideCart interface of the invention can also be modified by the background system to particularly identify to a user any previously established or visited links within which item parameters have been changed and which might therefore represent a link of interest to the user. Browsing presentations might identify links to domains or even particular content items that have undergone price changes or that might be associated with a promotion, by indicating those links with notable icons or by modified text coloring, as well as by re-ranking the effected item within the user's chosen organizational scheme.

With regard to the organizational scheme, whether in search mode or browse mode, the interface 60 is configured, in the exemplary embodiment of FIG. 3, with a main display window 74, the content of which is defined by a set of user configured display skins, organized in accordance with and selected from a set of "tabs" 76. As each tab is selected by a user, the display skin represented by that tab is brought to the forefront of the main display window 74 of the interface 60. In the particular exemplary embodiment of FIG. 3, a set of four tabs are illustrated, with each of the particular tabs invoking a particular functional operation of the system. Although four tabs are illustrated, it should be understood that the number of tabs (i.e., the number of functional skins) is not limited to any particular value. Indeed, the particular page accessed by a particular tab might further include an additional number of tabs contained within each of which identifies a particular sub-function of the particular top-level function identified by the categorical tab. Further, different numbers of top-level functions might be represented in both search and browse mode, such that the system is adaptively configured for relevance to a particular user, whether that user is browsing or searching.

Although the content of the main viewing area 74 of the interface 60 is illustrated in the exemplary embodiment of FIG. 3, as delineated by tabs, the informational content displayed in the viewing area might also be delineated by any one of a number of conventionally recognized forms. For example, the main viewing window might contain a series of graphical icons depicting folders, with the informational content pertinent to any particular folder being accessed by merely "clicking" thereon. Accessing a folder causes the interface's main viewing area to depict the set of objects, pages (skins) or content pointers that have been allocated to and saved within that particular folder, as well as defining a "point-of-departure" for the system to use in defining a particular contextual reference for subsequent search or browsing activities undertaken by a user. Alternatively, information might be organized within the main viewing window in the form of a hierarchical, categorical listing, similar to how information might be organized in an open directory architecture as implemented in certain Internet, index, catalog or search sites. Information might be organized in terms of a top-level categorical architecture, with various subcategories, functions, pages, objects, skins or the like, invoked by "clicking" on the top-level category descriptor comprising the top-level list. Accordingly, the invention is not necessarily concerned with specifically how the information is organized within the interface, nor is it particularly concerned with the type of access tool used to interface with the information (tabs, folders, lists, or the like). All that is required is that information contained within the interface be organized in a rational categorical fashion, such that the system is able to extract relevant contextual material from the interface's informational structure, as defined by the user, as well as from the scope of the information contained within any one of the categorical descriptors used to identify an elemental pool of information. It should also be understood that the various different forms of categorical descriptors could be available to a user by "right-clicking" a mouse button when the mouse cursor is positioned over a "tab," "folder," or "list element," with the "click" activity invoking a menu which includes a properties item. Additionally, a user might "hover" over an interface control in order to toggle or trigger it after an appointed time. Accessing the properties item might give the user an option to change the way a particular page, or set of pages, or even an entire category, is presented with regard to the aforementioned tab, folder and list arrangements.

Figure 4:
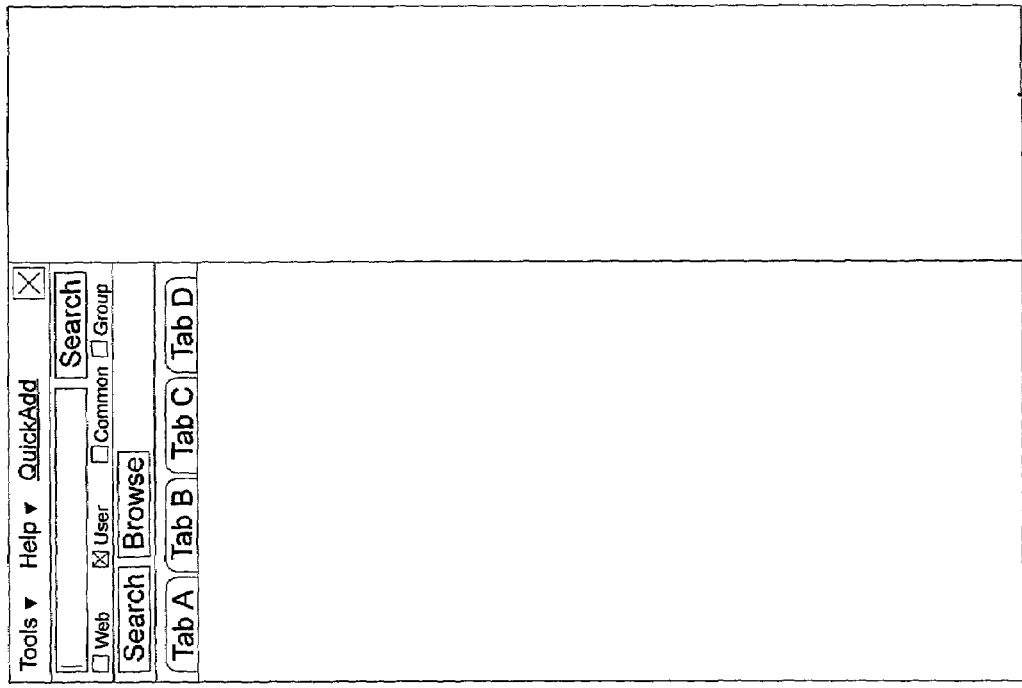
FIG. 4 is a simplified, semi schematic representational screen shot, depicting the SideCart interface of the invention in a browsing mode.

Turning now to the exemplary embodiment of FIG. 4, there is depicted an interface screen that might be implemented in the interface when the use is in a browse mode, with respect to the interface. In a manner similar to the exemplary embodiment of FIG. 3, the interface is generally identified at 60, with at least a truncated portion of a main browser window indicated at 62. The major functional portions of the interface 60, such as the ToolBar 64, search window 66, mode indication portion 70 and main viewing window 74 are all set forth as was described in connection with the generalized embodiment of FIG. 3. The exemplary embodiment of FIG. 4, however, has been modified to indicate that the system is in browse mode, by having the "browse" button indicated in bold. In the browse mode, four exemplary organizations are indicated as being accessible by the system by means of providing four tab headers, tab-A, tab-B, tab-C and tab-D controls. In the exemplary embodiment of FIG. 4, the tab-B organization (functionality) has been chosen as indicated by outlining the tab-B control in bold. Tab-B might further be thought of as a "directory" tab which informs the interface 60 that the user is accessing its directory functionality. When tab-B is invoked, the system displays a set of organized content information that has been allocated to the function termed "directory."

In a typical directory structure, the system allows the user to select which "categories" of information are to be browsed, by giving the user an option to select a categorical taxonomy, by making a selection from a drop-down category menu 80. As the user makes a selection from the categories menu 80, a presentation of subcategories within that category is made to the user in an appropriate field 82 provided for such purpose. The exemplary embodiment of FIG. 4, the subcategory field 82 contains an alphanumeric selection block 84, which further has alphabetical or numerical entries, corresponding to an alphanumeric field, indicated by underlining the particular letter of the alphabet or numeral that contain populated entries. Additionally, an alphanumeric, numeric or graphical icon list of subcategory entries might also be given beneath the alphanumeric indicator 84.

By way of example, the user might have chosen the categorical heading "cooking" from the category menu 80. In response, the interface displays a set of subcategories, i.e., barbecues, cookware, cutlery and equipment, as representing subcategories created by the user beneath the Rubric "cooking." As can be seen from FIG. 4, the alphanumeric indicator 84 has the alphabetical indices B, C and E underlined so as to represent that there are subcategories beginning with those letters of the alphabet within the subcategory list for the categorical heading "cooking."

It should further be understood that the interface, in accordance with the invention, can be configured to represent a categorical hierarchical structure greater than the three-level deep structure of the exemplary embodiment. If the user were to select a category, a set of subcategory indices would be presented in the appropriate field 82, with selection of a particular subcategory reconfiguring the category field 82 to a substantially similar form, with the subcategory now generating a hierarchical, alphanumeric, numeric or graphical icon listing of perhaps element categories contained within each subcategory.

Eventually, selection of a subcategory or an elemental category causes the interface to display a list of content pointers (links to content objects) which, when accessed, cause the user's main browser application to link to the particular page or object pointed to by the content pointer. Where the list of links is too long to be displayed in the content pointer link list 84, the link list space is traversed by either paging through the links or by scrolling through the links by means of a conventional scroll bar.

A further advantageous feature of the interface according to the invention is that as a user traverses the link list, a pop-up content description window 88 provides the user with a brief description of the type of content represented by the page or object pointed to by the specific content pointer with which it is associated. The pop-up window 88 can be invoked by a "mouse over" and gives the user an additional degree of information not readily available in search or browsing adjunct interface systems. Some of the information contained in the pop-up window can be used, by the user, to define various sorts of sorting criteria, particularly when the interface is implemented in connection with an electronic commerce application. The user can use some of the criteria to sort the information display results by using a menu of the right mouse button. Additional information in the pop-up window 88 can include item location, item price, item availability, compatible/recommended associated items or content, merchant provided ratings, or other forms of ratings provided by third-party network resources, the individual interface user or a system partner which provides such rating information.

The categorical hierarchical directory described in connection with the exemplary embodiment of FIG. 4, might be dynamically or statically provided for browsing through a universal collection of merchandise items represented by an information repository such as the Internet. The form and structure of the directory may be a universal object collection, provided by the administrator of the inventive system or, alternatively, might be a specific directory structure established, organized and maintained by a particular electronic commerce domain or an organization of such commerce domains. The directory system could also be rationally disjunct, in that certain ones of the categories established for the hierarchical structure could be defined by a particular commercial domain or an organization of commerce domains, while other categories might represent the starting point for a particular marketplace specific directory organized in conformance with a particular market-specific taxonomy. Automotive parts and accessories, for example, are illustrative of such a market-specific organization, since automotive parts and accessories are necessarily organized in accordance with a manufacturer, model number, and part number organization, all of which are inherently standardized across a universal automotive parts and accessories marketplace.

Other categories represented by the system might be established by the individual user, so as to create a personalized directory structure within which subcategories and elemental categories are organized in accordance only with the user's concept of what constitutes like-elements for incorporation within a particular category.

Further, and as an additional feature of the invention, certain elements of the categorical directory structure need not be defined by any one particular user, but might represent a categorical structure developed and defined by a community of users, all of which might be interested in a particular commercial marketplace and who have jointly established an organizational structure for commerce domains and/or commerce items within a particular category. Community development of a directory structure is performed in conformance with the methods discussed in co-pending patent application entitled "SYSTEM AND METHOD FOR SEARCHING AND RECOMMENDING OBJECTS FROM A CATEGORICALLY ORGANIZED INFORMATION REPOSITORY," filed Dec. 4, 2000, which is commonly owned by the assignee of the present invention and the entire disclosure of which is expressly incorporated herein by reference. Thus, it can be seen that the organizational directory structure of the interface, in accordance with the invention, is a highly flexible adaptively configurable arrangement which gives any one user, or community of users, the ability to rationally and efficiently organize various links to commercial centers in order to participate in the universal electronic commerce marketplace without suffering from substantial information overload.

A further advantageous feature of the browsing interface according to the invention is its ability to support persistency of past browsing activity. In an electronic commerce context, this is supported by providing the user with a number of commerce-oriented features, including a shopping cart, a shopping list, wish list, or a series of gift lists (unique to individuals, holidays or personally provided events and classified/organized into folders by the individual user), or commerce domain provided events such as sales, promotions or rebates. These commerce-oriented features are invoked by selecting an appropriate "tab," "folder," "list header," or whichever form of information collection identifier the user has chosen to represent the various features of the interface. Each of the commerce-oriented features are able to display past browser activity in that particular context, serve as a reference or anchor point for continuing or repetitive commerce domain interaction activities, or as a notice area for customized browsing activities as organized by the individual user or commerce merchant. The specific form of information relating to each of the aforementioned commerce-oriented features, are arranged in substantially the same form as depicted in the exemplary directory structure of FIG. 4. If the chosen feature is a wish list, or set of wish lists, the various lists populating the category are user selectable through the menu 80 or lists populating the "wish list" category are arranged in the subcategory display area 82. Selection of a particular list would then cause the interface to display the items populating that list and, as an item were selected, a set of content pointer links, pertinent to that item, would be set out in the appropriate display area of the interface. Selection of a content pointer link would then cause the browser application to open the link and display whatever content was associated with that link in the main browser window 62.

Past browsing activity persistence can be implemented in a number of different forms, chief of which are allowing the user to set a result filter, and having the system display all links but specifically identify traversed links. In the first instance, a user is able to set a result filter, by setting a filter switch which commands the interface to show all established links, only those links which the user has traversed within a set time parameter, for example, or only those links which a user has not traversed within the defined time parameter. Enabling a "have seen/haven't seen" filter control in the interface would enable only small changes to the default interface presentation, thereby allowing the individual user to select when previous browsing activities should be used to influence information presentation.

Alternatively, the interface can be configured to include a marker, or as some elements may have multiple types, a combination of markers, most appropriately in the form of a specialized icon, which functions to indicate that a user has had a previous interaction with a content page, when the link to that content page is displayed in any form in the interface, i.e., displayed as a search result or as a saved link in any form, such as a shopping list item, a link to a catalog item or catalog index, or a link to an individual commerce domain from a list of commerce domains.

Browsing persistence functionality is available through any system within which the interface is installed and enabled, and provides the background system omnipresent access to each individual user's complete commercial domain interaction activity, each user's item lists, directory structure and browsing history. This level of interactive ubiquity functions to define an extremely accurate data set that is used by the novel interface, the underlying background system's relevance engine and/or a commerce partner in order to define a realistic and efficient transactional environment within which electronic commerce can be carried out. Universal data collection is supported by the underlying background system, regardless of the characteristics and configuration of the user system through which the interface is invoked or regardless of that system's location. Any configured device is able to provide usage data to the background system, with the background system further able to allocate not only the type of device, but also the location of a device as well as the time-of-day of usage to a relevance data script. For example, the background system is able to determine whether different device types are most likely used to perform different tasks, and also which devices are most likely used in which kinds of different situations and locations. Also, activity information is acquired that can identify whether similar devices are used, but at different locations, such as home or office, for different tasks, rationally related to the different locations. It should be recognized that certain types of commercial activity will be undertaken in a work environment, while different forms of commercial activity are undertaken in a home, or other form of environment, such as a mobile/geographically distributed, environment. Activity persistence is evaluated with respect to any one of the aforementioned parameters, i.e., system type, system location, time-of-day, and the like and is allocated between and among a number of user profiles that are specific to each of the parameters.

This comprehensive activity analysis enables the interface to provide a user with browsing support to find new items or not previously browsed or searched items, allowing individual users to interactively select only new items, all items, items not before seen or items seen before when browsing search results, and the like. This browsing functionality can also be used to support additional commerce-specific tasks such as purchase receipt management, item shipment tracking, merchandise returns, affiliate programs or other discounting or price differentiating programs and automated frequent purchasing methodologies, all of which are related to each individual user's profile, a particular vendor's support for each feature and the device used for each task as supported by the interface.

A user may also user the interface to navigate among commerce domains, as well as to understand the relationship between moving among commerce domains and accessing each domain's specific content or merchandise. A hierarchy, framework or catalog index of any particular commerce domain can be displayed within the interface and used in place of in-page navigation elements of the type normally statically displayed on a specific commerce domain, thereby reducing page content generation by the providing commerce domain.

Commerce domains that are partnered with the inventive system are able to "push" such indices to the interface whenever that particular commerce domain is accessed by pursuing a link thereto from the interface. The participating commerce domain recognizes that it is being accessed by an inventive interface capable system and automatically pushes an index to the interface in response. Alternatively, the interface is able to develop a hierarchy, framework or catalog index which is personalized for each individual user or a predicted type of user, which supports navigating through any particular commerce domain. The hierarchy, framework or catalog index is adaptable, so as to change as the individual user's interests change, thereby providing a more relevant commerce experience. Offloading this framework or catalog index definition into the inventive interface reduces the content serving responsibilities of the commerce domain quite substantially, as well as offers the commerce domain the added benefit of freeing display space in each commerce domain's main content area, for additional content, as opposed to domain navigational controls or aides. In addition to reducing the commerce domain's server load, the real-time feedback displayed in the inventive interface is able to improve individual interaction with the commerce domain due to its responsive nature, as well as the higher level of individual understanding of preferences and activity intent, while a user is interacting with the commerce domain.

In summary, and in the context of participating commerce domains, the underlying system is able to present to a user a commerce domain organized in accordance with that domain's internal structure. In the case of a store, for example, the system can organize the top-level category "hardware store" into its respective internal "departments" with a list of product categories, for example, organized within each "department." Item categories would be further subdivided into individual items, such that the complete commercial organization of a "store" would be presented to the user in an efficient form. Each item could be allocated to a specific content page, such that a user could search for and traverse directly to a single content page for each item offered by the "store." Having this type of information in the SideCart interface (i.e., in the form of a directory or other navigational aide) will assist a participating commerce domain in acquiring and retaining visitors to their electronic commerce site. Once a user is in a particular "store" the SideCart interface keeps a list of "departments" and "items" in front of the user, such that the user need only traverse and select from the SideCart interface in order to view merchandise, rather than repetitively jumping back-and-forth between a product page and a commerce domain's directory or home page.

The SideCart interface will be understood as allowing a customized hierarchy to be developed for each "store," type of "item" and a particular category of user. A directory developed in this fashion is dynamic and allows a user to both browse the directory of items as well as search the directory for specific "departments" or "items." Necessarily, the SideCart interface defines a permanent navigational frame to assist a user while shopping.

Further, and in accordance with the invention, the background system is able to establish a set of recommended commerce links for any particular user, as the user visits a particular page or is located within a folder (or a directory or catalog category) for that particular page topic. Depending on the user's location within the SideCart interface structure, a "recommended commerce link" button can be activated by the user and provides to the user a list of recommended commerce links associated with that particular page or page topic. For example, if the user were located within a "football" page, the recommended commerce links displayed to the user might include a list of links to ticket agencies through which the user is able to purchase tickets for any particular football game. A city page might return a list of hotels and restaurants as recommended commerce links for that particular city, while a ski chalet page might return vendors of skis and winter clothes, as recommended commerce links.

It should also be understood that recommended links for any particular product or page will be different depending on the context of each page's individual use. This use is necessarily dependent on the individual user's browsing history and personal relevance information, as developed by a personalized relevance model. As an example, if the user were in a ski chalet page, one set of related links might point to vendors of skis and/or winter clothes. If, however, the user were interested in planning a winter vacation, as evidenced by the user's past browsing activity directed towards travel agencies, and the like, recommended links proposed by the system might rather point to airlines, automobile rentals, and other commerce sites more appropriate to travel planning. Accordingly, related links for a product are not necessarily implemented within the text of a product page; rather, they are implemented within the SideCart interface of the invention. In this manner, a static page will find it easier to be indexed by search engines, because its informational content is more uniform. Further, visited pages for purchased items are savable as preferred links, making each page more understandable because it is more memorable (the user having actually visited the page).

An additional functional feature, i.e., a search functional feature, will now be described in connection with the exemplary SideCart interface screen of FIG. 5. In the exemplary embodiment of FIG. 5, once again similar elements are defined by the same identification numerals as in the exemplary embodiments of FIGS. 3 and 4. Thus, a truncated representation of the main browser window is identified as 62, with the SideCart interface screen identified at 60. However, in this particular instance, search mode is the active mode, which can be activated by many means, one such being the search mode button 72, indicating that the SideCart interface is now in search mode and that the information presented in the main viewing window 74 is related to search activities. When the system is in search mode, the system is able to not only initiate initial queries for a specific item or items, but also is able to map query key word terms to certain domains, content, topics and/or actions, in accordance with an established user profile and in conjunction with a defined personalized user relevance model which affirmatively includes user interaction and activity parametric data. The SideCart interface system is thereby able to augment key word query searches, filter the search results as well as re-rank the search results in accordance with a predetermined set of user established criteria. For purposes of this discussion, the activity described as searching will be deemed to comprise the tasks of entering a key word query term, activating the query and processing the results. Result processing may include the previously mentioned query augmentation functionality, but certainly includes result filtering and result re-ranking by the system. Moreover, an automated query methodology is also supported, for a number of different events, including those where certain content or item characteristics have been met.

Automated queries are established for certain kinds of user activities and are launched or invoked whenever the user undertakes these activities. Additionally, query automation can be controlled by the user setting a specified criterion or a set of criteria, with an automated query being launched upon satisfaction of the parameters. Automated queries are launched at the passage of a particular unit of time or at a specific time, if these parameters are established by a user. Further, automated queries can be assembled and launched whenever a compatible or otherwise linked item is purchased or viewed by the SideCart interface user. Additionally, automated queries can be launched after a certain chain of items, or types of content, are viewed by the SideCart interface user, either in sequence or over a series of visits over time or indeed after a repeatedly set of similar or identical visits to a certain set of items or an identified content collection. Additionally, automated queries are able to search over multiple commerce domains, but with the contextual relevance of using a pre-established user profile as an engine to substitute keywords for items. In effect, the preestablished user profile functions as a lookup index for similarly named items, such as automatically querying "tissues" and "wipes" while searching for "Kleenex." Substitute or augmented keywords are those which the system defines as contextually relevant to the queried merchandise type, as defined by commerce site data mined by the system, or by a catalog or hierarchy of terms, or by individual relevance profiles. This keyword augmentation or tautology for catalog terms can also be made more relevant by applying a set of chosen, observed or provided brand preferences, when the user searches for or compares resulting merchandise items or content.

Search results are also able to be manipulated in the SideCart interface by re-ranking the search results according to various ordering matrix, such as date and time, alphanumeric ordering, and also by price, shipping and availability. Results are filtered in the SideCart interface by establishing personal preferences for merchandise including required closing sizes or colors, make and models of automobiles, commerce merchant preferences and the like. The foregoing preferences are developed in a user profile, in conjunction with a personalized relevance model which is defined by the background system in accordance with a procedure described in co-pending patent application entitled "HIERARCHICAL MODEL FOR DYNAMIC PERSONALIZATION OF OBJECT SPACES AND PRIVACY PROTECTION, filed on Dec. 4, 2000, commonly owned by the assignee of the present invention, the entire disclosure of which is expressly incorporated herein by reference.

User profiles established in this matter are simply and easily updated to include particular user parametrics, such as clothing sizes and colors, make and models of automobiles, and the like. Commerce merchant preferences can be established by having the background system evaluate user activities and interaction with particular commerce sites and assign preference metrics to various sites depending upon the length of time a user spends interacting with the site, the amount of merchandise purchased from the site, or any other commercially related metric that might provide an indication of relevance or preference vis-a-vis another site. In keeping with the personalized relevance model established above, the side bar interface is able to include restrictions on searching commerce domains by providing a particular set or inferred set of commerce site departments or commerce site categories of merchandise through which to search. Identifying an individualized set of objects existing within a generalized universe of objects is the function of a personalized relevance engine and this functionality maybe easily applied to the electronic commerce experience.

Figure 5:
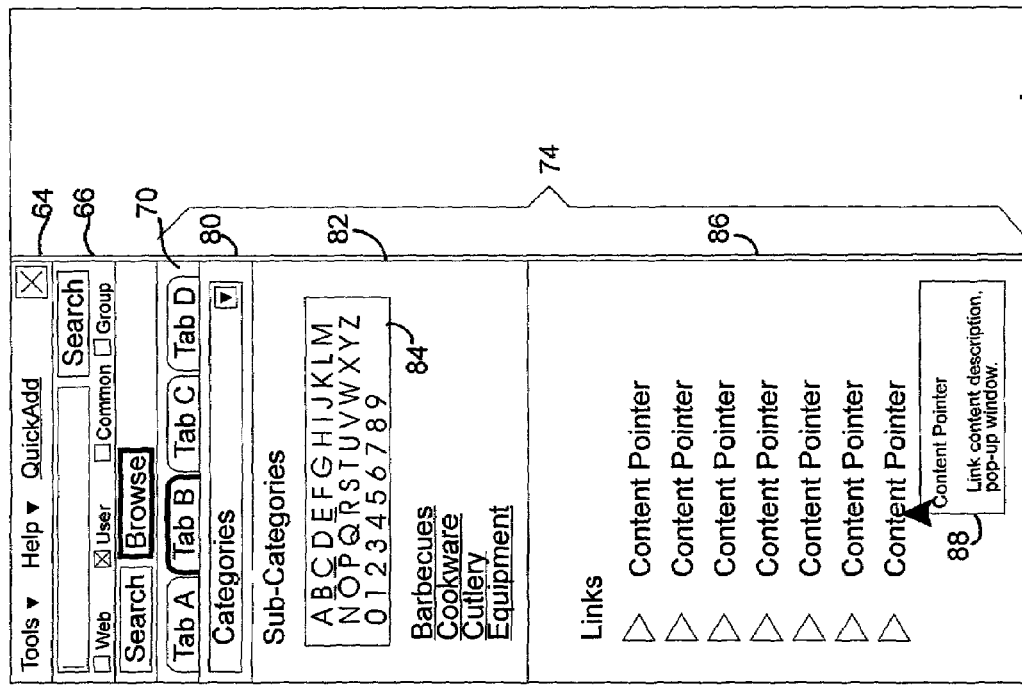
FIG. 5 is a simplified, semi schematic representational screen shot, depicting the SideCart interface of the invention in a search mode.
Figure 6:
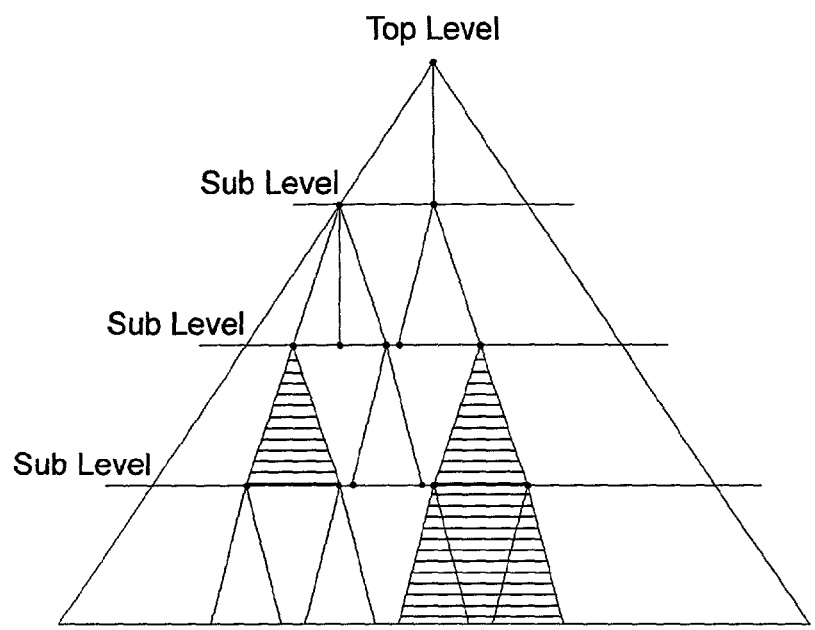
FIG. 6 is a simplified illustration of an object universe with personalized relevance areas defined for a particular user.
Figure 7:
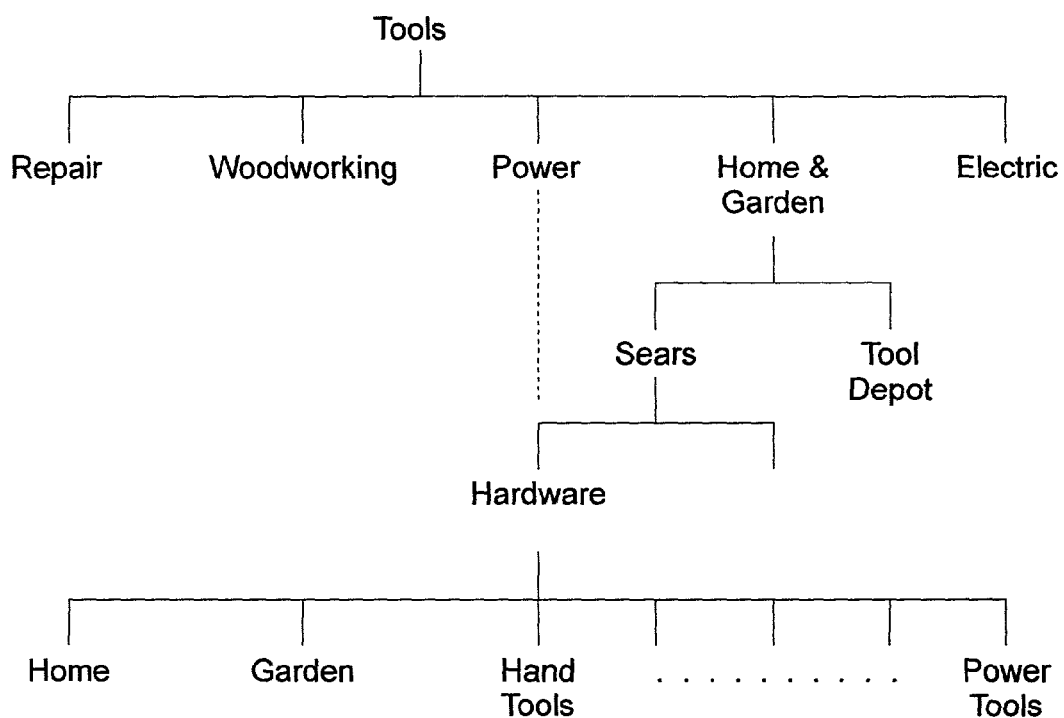
FIG. 7 is a simplified illustration of a hierarchical organization of content domains, in accordance with the invention.
Figure 8:
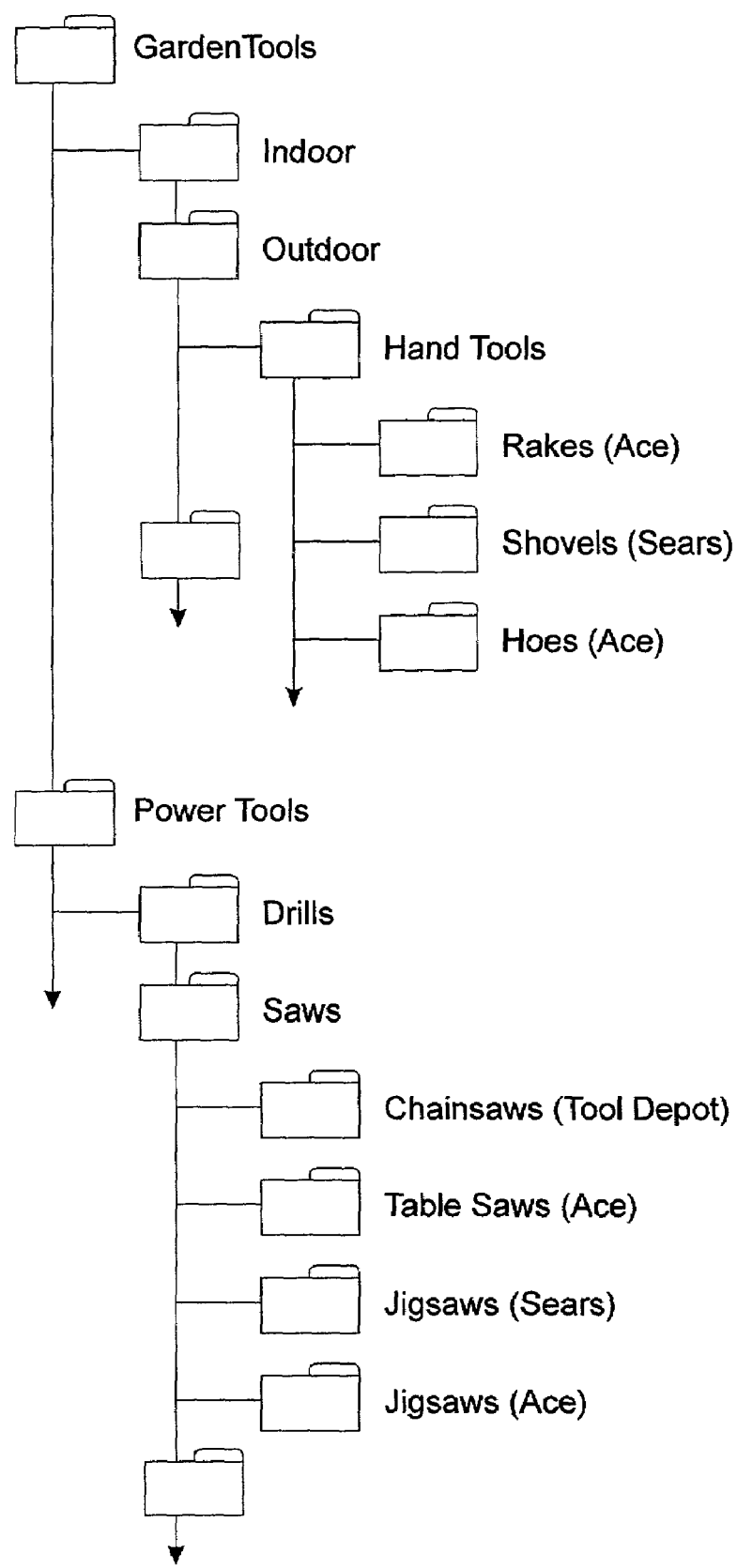
FIG. 8 is a simplified illustration of a hierarchical organization of content items, without regard to an item's host domain, to define an intra-domain categorical structure in accordance with the invention.

Returning now to the exemplary embodiment of a search screen according to the SideCart interface of FIG. 5, the interface screen is once again implemented to one side of the main window of a user's possessive browser application program. The search interface screen includes a main viewing area 74 which is further delineated and informed by a set of tabs which define the presentation elements and presentation style of the viewing area 74. Specifically, the various tabs would be identified with functional names such as "shopping cart", "shopping list", "purchases", "directory", and the like, with each tab containing particular elements relating to the respective descriptive header.

Within each tab, a search filer 90 allows the user to more completely inform the results of a particular search operation, by giving the user the option to "show" certain sets of items. The filter 90 allows a user to select whether to show "all" of the items returned by the search, only those items the user "has seen" or only those items the user indicates as "haven't seen." The has/haven't seen options relate to establishing a filter depending upon previous user activity with regard to particular sites or commerce domains that a particular search might develop. If the user has been previously interacting with certain content sites relating to woodworking tools, for example, the "has seen" option will return only content pointers directed to those sites with which the user has previously interacted. Conversely, the "haven't seen" option causes the search engine to return content pointers only to new sites, or sites that the user may have interacted with in the past, but have "timed out" so as to qualify as "new."

Query search results shown in the SideCart interface's main viewing area 74 and are listed in accordance with a ranking order which is developed by satisfying a number of searching and recommendation parameters. Certain of these parameters would include the recommendation parameters established by a commercial search engine, if the search functionality of the background system is being hosted by a third-party search platform. Further parameters, whether search or recommendation parameters, are established from analysis of the user's personalized profile in combination with the user's personalized hierarchical relevance model, which includes user activity and interaction data. Search and content pointers, satisfying a particular search request, are listed in the viewing area 74 of the SideCart interface, and are immediately available for access by a user when the user positions a cursor over a content pointer item and clicks. Expansion function buttons are disposed adjacent each of the content pointer items and, when clicked by a user, cause a detailed description of the particular object to which the content pointer points, to appear beneath the content pointer item. In FIG. 5, the final content pointer comprising the list of search results has had its expansion function button accessed, causing link content material to appear within a pop-up window 92. Link content descriptions could also be accessed by a "mouse over" function, as opposed to requiring the user to select and expanded function button Similarly, a link content description could be provided as appended text beneath a selected content pointer, rather than having the link content description appear in a pop-up window.

In operation, the system's search functionality, making use of user profile and personal relevance model information, is able to make relevance determinations without regard to item diversity. For example, if the system is able to differentiate between objects containing identical query terms, but having completely different content. If a user were searching for "java", the system is able to determine whether the user is initiating a query for java as in the coffee, Java the island, or the JAVA programming language, by evaluating contextual information gleaned from the user profile relevance model against contextual information developed from a search result object. In addition to contextualizing, a user's possessive browsing and/or past purchasing history is available through the SideCart interface, thereby allowing the search engine to develop store preference information, for example, for search result re-ranking based upon previous purchases from that site. Additionally, certain site-specific content information is also processed by the background system, allowing the search functionality to extend its recommendation ordering beyond a personal re-ranking, but mining sales and promotional notices from desirable content sites and providing those sites to the user with either a higher ordering indicator or by explicit iconic designation. Other attributes can be assigned to the system's possessive search functionality, such as a "time of year" attribute that might indicate that Christmas related items should have a higher result preference, when the system's time and date engine indicates it is now December.

All of these particular search parameters, attributes, profiles, relevance models and the like, are stored within the background system's database and identified as belonging to a particular user. Sets of preferential data can be allocated to specific users or to a community of users that have aggregated themselves with respect to a particular item, set of items, topics, categories or the like aggregating users into communities of this type allows participants within that community to avail themselves of parametric and attribute data established by the community and which have been refined by aggregate usage over a more extended period of time. Individual users belonging to an aggregate community of users expresses an interest in woodworking, but will necessarily have access to woodworking sites that have been visited and evaluated by a large number of potential purchasers, with only the most appropriate sites experiencing repeat visits, lengthy dwell times, and substantial numbers of purchases. Such user communities would be able to very efficiently develop item preference data such as desirable brands, types of product descriptions, and a topical product hierarchy, that individual users may either access directly or import and customize based upon an individualized personal relevance.

In the embodiment of FIG. 5, a user need only enter a keyword query term into the text block of the SideCart interface's search area 66 and execute a search, in order that relevant items be returned and displayed in the main viewing area 74. When executing a search, the user is able to identify whether the search will be conducted over the user data maintained by the interface, user group data, an aggregate set of common data, or whether the search will be conducted over the universe of information represented by the World Wide Web. These choices are not necessarily mutually exclusive, with the user able to select between and among some or all of the indicated object repositories. In any case, keyword query searches are augmented with contextual information and the search results are further organized, categorized and displayed in accordance with contextual recommendation information as described above.

In addition to supporting keyword query searches, the SideCart interface in accordance with the invention allows for the provision of continual feedback information to the individual user, even when the user is browsing the Web through their main browser interface. For example, when a user is visiting a particular commerce domain, the user need merely initiate a search by clicking on the SideCart interface's search button 94 in order to have the system infer which items on that particular commerce domain are most relevant to the individual user's current commerce task. No search terms or query words are necessary for the user to enter, before clicking the interface control to initiate the search. "One-click searching" is supported by the SideCart interface's possessive ability to capture and analyze past and present user behavior, and process that behavior information in order to develop a set of relevance indicia that might pertain to a particular commerce domain. A user, having expressed an interest in java programming language related items, by virtue of previous site visits, previous product purchases and indicia developed in s relevance model, need only "single click" the search button when the user is visiting a commerce site such as Amazon.com, for example, in order that content pages relevant to goods and services related to java programming language are extracted from the site and displayed to the user.

In contrast to currently implemented commerce domains or market places, whose pages are primarily customized based on an individual user's past behavior on the specific commerce domain, the SideCart interface in accordance with the invention, provides a significantly more relevant set of results based on a user's possessive inter-commerce domain behavior, as well as immediately previous user behavior of any kind in the SideCart interface. Additionally, the interface is able to access a set of preferred links which are already present in each individual user's profile, and does not require any additional interaction with the user in order to retrieve full information on a desired item.

Further, "Single-click searching" is enhanced by the system by utilizing the user's possessive virtual location within the interface, i.e., categorical hierarchies which the user may have already selected, individual links to a merchandise item or a set of links to merchandise items, or terms already in the query entry field, as targets for a single click search. The system is able to infer whether the single click search results should include either a result set compromising a single merchandise item among a set of different commerce domains or a number of items within a single commerce domain. The system is able to analyze previously selected items, or a set of items, in order to determine preferred items for which to search, as well as the most likely commerce domains from which to extract the resulting merchandise items.

Items returned by any one of the search methodologies described above, can be added to the content collection comprising of the SideCart interface, by clicking on the "add" function provided in the toolbar menu area 64 at the top of the SideCart interface or by dragging the element into the SideCart. Further, and in accordance with the invention, the system extracts content and the context information from the added content pointer and uses this information to allocate the content pointer to a corresponding position within a user's hierarchical organizational structure. Thus, a user might link to a particular commerce domain, performa single click search on that domain and "add" the results of that search to their contents collection without any further manipulation of either the interface controls or browser controls. Information so added to a user's possessive content collection necessary informs the user's profile, as well as explicitly informing a user's behavioral characteristics with respect to that particular content domain and the "added" content pointers (product items, for example).

With the foregoing information, the system is able to generate a user-specific meta catalog similar to the Open Directory Project-Internet Hierarchical structure. By analyzing and logging a user's possessive commerce behavior. Individual commerce domains and/or commerce items are populated into such a meta catalog on the basis of explicit user interaction with regard to those items or domains. It will be understood that a dual meta catalog system might be developed for each specific user, with one catalog structured to contain the universe of that user's preferred commerce domain links, and another structured and organized by item content, without regard to the hosting domain. Accordingly, a set of item (or product) specific links might be established under a canonical categorical heading, with each of the links representing a different commerce domain, such that the system provides for inter-domain commercial activity. A user is able to shop and browse inter-site, in accordance with their version of a product catalog with item sorting or item preferences derived from that user's possessive profile based on prompt user relevance matrix that have been established and/or re-ranked based upon previous user activity. Items, domains or other objects are assigned to "preferred" status on the basis of user relevance criteria reaching a particular predetermined level. These criteria might be based upon a number of purchases from a particular link, a dwell time within a link, a number of visits to a particular link, and the like. All of this information and structuring is available from a ubiquitous SideCart interface, that is co-located with respect to a user's main browser window, in order to provide a personalized commercial object model for use in conjunction with Web-based activities, since conventional browsing is too cumbersome and unnatural for electronic commerce.

In summary, the SideCart interface operates in conjunction with user profile and relevance model information which contains specific preference, activity and domain specific content attributes. The interface profile and model make use of a user's content and privacy preferences to promote, support and enable a pleasurable and efficient electronic commercial experience. As discussed above, a personally relevant commercial experience can only be possible by having a deep understanding of each individual's possessive preferences and behaviors, which can then be used to enable both browsing and searching in the context of specific commercial content. The SideCart interface system described herein supports these activities by providing an interface to support browsing and searching tasks in tandem, and functions in conjunction with the background system to support relevant, contextual activities at appropriate times.

Accordingly, while this specification, for the sake of clarity and disclosure, at times uses specific terminology and constructs to refer to certain aspects of the invention and its operating environment, it will be recognized that the invention set forth herein is applicable in other areas, as well. For example, this specification frequently refers to the Internet, Web sites, Web pages, and documents; it should be observed that the invention is equally applicable to other types of documents, databases, and document collections. Moreover, references to bookmarks, favorites, and preferences are not intended to be limited to any particular implementation (or set of implementations) for retaining information on users' browsing habits, but instead should be construed to apply to all means and methods for specifying and retaining such information.

Similarly, HTML is described as the most common format or language for describing documents on the Web; it should be noted that other document formats (such as XML, SGML, plain ASCII text, plain Unicode text, and other standard and proprietary formats) are also in use on the Internet and in various other document-based applications; this invention will function equally well in the context of networks utilizing other formats or even multiple formats. For the purposes of certain aspects of the invention (such as summarization and recommendation), the only limitation is that the format be decomposable into a language (which can even be accomplished, in image-based formats, through character recognition). The term "document" is intended to refer to any machine- or human-readable data file (or collection of related files) from which information can be retrieved.

URLs are typically used to access information on the Internet, and frequently on other networks, as well. However, it should be recognized that other means of specifying the location, identity, and nature of a requested document are also possible; such alternative schemes would be apparent to a practitioner of ordinary skill in the art, and the invention is deemed to cover these variations.

When the present disclosure refers to Web browsers, it should be recognized that other information access applications are also relevant, including but not limited to information sharing and access tools such as Lotus Notes, database systems, and other data sharing and retrieval applications. Accordingly, the invention will be understood as not being limited to the specific embodiments described above, but is rather intended to cover the full range and scope of the appended claims.

The invention claimed is:

1. A method for interacting with an information repository, the repository storing objects in an object space, a user accessing the object space through a network interface application, the method comprising:
   executing a personalized relevance interface application within the network interface application, the personalized relevance interface application adaptively maintaining a collection of content pointers accessible by the network interface application, each content pointer corresponding to an object within the object space, the collection of content pointers organized as a grouping of sets of indicia;
   generating a subject keyword;

evaluating with the personalized relevance interface application the subject keyword and automatically retrieving from the object space objects relevant to the subject keyword each retrieved object associated with the content indicia; and organizing and displaying the retrieved objects with the personalized relevance interface application in accordance with a relevance context associated with at least one user.

2. The method according to claim 1, further comprising:
maintaining a historical record of object interaction by a user;
enabling storage or selection of preferred objects by a user; and
wherein the relevance context of the at least one user is derived at least in part from the preferred objects selected by the user as indicated in the historical record.

3. The method according to claim 1, wherein the network interface application comprises a network browser application configured to display content defining an object, the personalized relevance interface application automatically generating the subject keyword from the content of a displayed object.

4. The method according to claim 1, wherein the network interface application comprises a network browser application configured to display content defining an object, the personalized relevance interface application automatically generating the subject keyword in response to a user input of one or more keywords.

5. The method according to claim 1, wherein organizing and displaying the retrieved objects comprises evaluating a historical record of user behavior with respect to the displayed objects.

6. The method according to claim 5, wherein the user behavior is selected from the group consisting of a user dwell time at a particular object, a number of repeat visits to a particular object, and a number of purchases made from a particular Web site.

7. The method according to claim 5, further comprising:
the personalized relevance interface application establishing a catalog of relevant object collections based upon the historical record of user behavior; and
the personalized relevance interface application automatically populating the catalog with relevant object collections based upon the historical record of user behavior.

8. The method according to claim 7, wherein the catalog comprises a listing of object space domains.

9. A method for interacting with an information repository, the repository storing objects in an object space, a user accessing the object space through a network interface application, the method comprising:
executing a personalized relevance interface application within the network interface application, the personalized relevance interface application adaptively maintaining a collection of content pointers accessible byte network interface application, each content pointer corresponding to an object within the object space, the collection of content pointers organized as a grouping of sets of indicia;
accessing a particular object within the object space with the network interface application;
receiving a request for a relevance search for the accessed object;
evaluating with the personalized relevance interface application a content indicia of the particular object accessed and automatically retrieving an additional set of objects from the object space, each retrieved object associated with the content indicia; and
organizing and displaying the additional set of objects with the personalized relevance interface application in accordance with a relevance context derived from the collection of content pointers.

10. The method according to claim 9, wherein evaluating a content indicia further comprises:
reading content from a network domain; and
ordering the read content so as to establish a keyword context collection defining the content indicia evaluated by the personalized relevant interface application.

11. The method according to claim 9, further comprising the personalized relevant interface application:
searching the indicia groupings of the collection of content pointers;
comparing each grouping indicia to the keyword context collection;
assigning an index to each grouping indicia that matches a keyword context from the keyword context collection; and
accessing pages of a network domain in accordance with the assigned index, the accessed pages having content corresponding to a keyword context matching a grouping indicia of the collection of content pointers.

12. The method according to claim 11, wherein the network domain comprises an electronic commerce site, the site further including a plurality of content pages organized in accordance with a product hierarchy and, wherein the collection of content pointers comprises a hierarchical organization of user defined recommended content sites, the personalized relevance interface application extracting particular ones of content pages from an accessed domain in accordance with a relevance model based upon a user's hierarchical organization of recommended content sites.

13. The method according to claim 12 further comprising displaying only those content pages which are extracted in accordance with the relevance model.

14. A method fur interacting with an information repository, the repository storing object in an object space, a user accessing the object space through a network interface application, the method comprising:
executing a personalized relevance interface application within the network interface application, the personalized relevance interface application adaptively maintaining a collection of content pointers accessible by the network interface application, each content pointer corresponding to an object within the object space, the collection of content pointers organized as a grouping of sets of indicia;
enabling a user to browse through a plurality of objects within the object space using the personalized relevance interface application;
enabling the user to access particular ones of the objects;
evaluating with the personalized relevance interface application a content indicia of the particular objects accessed and automatically retrieving an additional set of objects from the object space, each retrieved object associated with content indicia;
assigning with the personalized relevance interface application each such accessed object to a position within the a context relevant hierarchy; and
organizing and displaying the additional set of objects with the personalized relevance interface application in accordance with the context relevant hierarchy.

15. The method according to claim 14, further comprising:
evaluating a content indicia of each object accessed; and
displaying with the personalized relevance interface application the context relevant hierarchy to the user in accordance with a ranking order determined by a user profile associated with the user.

16. The method according to claim 15, wherein the user profile comprises a relevance model, the relevance model adaptively redefining the context relevant hierarchy in accordance with objects accessed by a user.

17. The method according to claim 14, wherein the information repository comprises object information from a plurality of network domains, each including a plurality of content pages organized in accordance with a product hierarchy and, wherein the collection of content pointers comprises a hierarchical organization of user defined recommended content sites, the personalized relevance interface application assigning particular ones of content pages from an accessed domain to the collection of content pointers in accordance with a user's hierarchical organization of recommended content sites.

18. The method according to claim 16, the relevance model adaptively redefining the context relevant hierarchy in accordance with a user's browsing interaction metric.

19. The method according to claim 18, wherein the user's browsing interaction metric is selected from the group consisting of a user dwell time at a particular page, a number of repeat visits to a particular page, a time of day at which a user visits a page, a time of year, a system type used to access a page, and a number of purchases made from a particular domain.

20. A method for interacting with an information repository, the repository storing objects in an object space, a user accessing the object space through a network interface application, the method comprising the steps of:
executing a personalized relevance interface application within the network interface application, the personalized relevance interface application adaptively maintaining a collection of content pointers accessible by the network interface application, each content pointer corresponding to an object within the object space, the collection of content pointers organized as a grouping of sets of indicia;
establishing with the personalized relevance interface application a context relevant organization, the context relevant organization structured to contain a set of objects, the objects categorized in accordance with a user defined relevance metric;
enabling a user to browse through a plurality of objects within the object space using the personalized relevance interface application;
enabling the user to access particular ones of the objects;
evaluating with the personalized relevance interface application a content indicia of each object accessed and automatically retrieving an additional set of objects from the object space, each retrieved object associated with content indicia;
assigning with the personalized relevance interface application each such accessed object to a position within the context relevant organization; and
adaptively arranging with the personalized relevance interface application the position of accessed objects in the context relevant organization in accordance with a user's browsing interaction behavior metric describing user behavior.

21. The method according to claim 20, wherein the collection of content pointers is adaptively defined in accordance with the context relevant organization.

22. The method according to claim 20, wherein the information repository comprises a object information from a plurality of network domains, at least one domain including a plurality of content pages organized in accordance with a product hierarchy and, wherein the context relevant organization comprises a hierarchical organization of user defined recommended content sites, the personalized relevance interface application assigning particular ones of accessed objects to the collection of content pointers.

23. The method according to claim 22, further comprising:
generating at least one subject keyword;
searching the plurality of network domains with the network interface application, in accordance with the at least one subject keyword;
retrieving content page pointers from the network domains, each retrieved content page pointer associated with the at least one subject keyword; and
organizing and displaying the retrieved content page pointers using the personalized relevance interface application in accordance with a relevance context derived from the context relevant organization.

24. The method according to claim 23, wherein the network interface application comprises an Internet browser application configured to display content defining an object, the personalized relevance interface application automatically generating the at least one subject keyword from the content of a displayed object.

25. The method according to claim 20, further comprising:
maintaining a record of browsing interaction behavior metrics by a user;
enabling storage or selection of preferred objects by a user; and
deriving the relevance context from the record of browsing interaction behavior metrics.

26. The method according to claim 25, wherein maintaining a record of browsing interaction behavior metrics further comprises analyzing user behavior with respect to displayed objects, and deriving the relevance context from the user behavior.

27. The method according to claim 26, wherein the user behavior is selected from the group consisting of a user dwell time at a particular object, a number of repeat visits to a particular object, a time of day, a time of year, a system used to access an object, and a number of purchases made from a particular Web domain.

* * * * *

UNITED STATES PATENT AND TRADEMARK OFFICE
CERTIFICATE OF CORRECTION

PATENT NO. : 7,089,237 B2
APPLICATION NO. : 09/770702
DATED : August 8, 2006
INVENTOR(S) : Turnbull et al.

Page 1 of 1

It is certified that error appears in the above-identified patent and that said Letters Patent is hereby corrected as shown below:

Claim 9, Column 25, Line 56, replace "byte" with --by the--.

Claim 14, Column 26, Line 64, replace "within the a context" with --within a--

Signed and Sealed this

Seventh Day of November, 2006

JON W. DUDAS
*Director of the United States Patent and Trademark Office*